(12) United States Patent
Murphy

(10) Patent No.: US 11,646,988 B2
(45) Date of Patent: *May 9, 2023

(54) VERIFIED HYPERMEDIA COMMUNICATIONS

(71) Applicant: Jeffrey N. Murphy, Elburn, IL (US)

(72) Inventor: Jeffrey N. Murphy, Elburn, IL (US)

(*) Notice: Subject to any disclaimer, the term of this patent is extended or adjusted under 35 U.S.C. 154(b) by 0 days.

This patent is subject to a terminal disclaimer.

(21) Appl. No.: 17/806,523

(22) Filed: Jun. 13, 2022

(65) Prior Publication Data

US 2022/0311726 A1 Sep. 29, 2022

Related U.S. Application Data

(63) Continuation of application No. 15/441,908, filed on Feb. 24, 2017, now Pat. No. 11,405,346.

(60) Provisional application No. 62/299,517, filed on Feb. 24, 2016.

(51) Int. Cl.
| | |
|---|---|
| *H04L 51/224* | (2022.01) |
| *H04W 4/12* | (2009.01) |
| *H04L 67/02* | (2022.01) |
| *H04L 51/18* | (2022.01) |
| *H04L 51/52* | (2022.01) |

(52) U.S. Cl.
CPC .......... *H04L 51/224* (2022.05); *H04L 51/18* (2013.01); *H04L 51/52* (2022.05); *H04L 67/02* (2013.01); *H04W 4/12* (2013.01)

(58) Field of Classification Search
CPC ....... H04L 51/224; H04L 51/18; H04L 51/52; H04L 67/02; H04W 4/12
See application file for complete search history.

(56) References Cited

U.S. PATENT DOCUMENTS

| | | | | |
|---|---|---|---|---|
| 6,957,224 | B1 * | 10/2005 | Megiddo | G06F 16/955 |
| | | | | 707/999.102 |
| 8,560,843 | B1 * | 10/2013 | Moscaritolo | H04L 67/02 |
| | | | | 713/162 |
| 8,615,554 | B1 * | 12/2013 | King | H04L 51/18 |
| | | | | 709/204 |
| 2008/0134052 | A1 * | 6/2008 | Davis | H04L 51/212 |
| | | | | 715/744 |

* cited by examiner

*Primary Examiner* — Anh Nguyen
(74) *Attorney, Agent, or Firm* — Dunlap Bennett & Ludwig, PLLC; Anna L. Kinney

(57) ABSTRACT

A verified method of high-value, person-to-person communication is provided. The method comprises creating a unique dynamic messaging link recognizable to a selected intended recipient; creating a transmissible personal hypermedia message to which the link is assigned; and storing the hypermedia message on a device accessible to a network. The link comprises a recognizable proprietary domain name and a random hash code. The individual is sent a direct message and the device is monitored for transmission thereto of the link, analyzing and storing accompanying metadata. The direct message contains an invitation to click on the link over the imprimatur of a person known to the recipient. The invitation contains descriptive material relating to the hypermedia message. Upon activation of the link, without redirection, the hypermedia message is transmitted to the recipient and the sender is notified. The sender is alerted if the link has not been activated within a predetermined period.

14 Claims, 11 Drawing Sheets

SYSTEM

EXAMPLE DATA

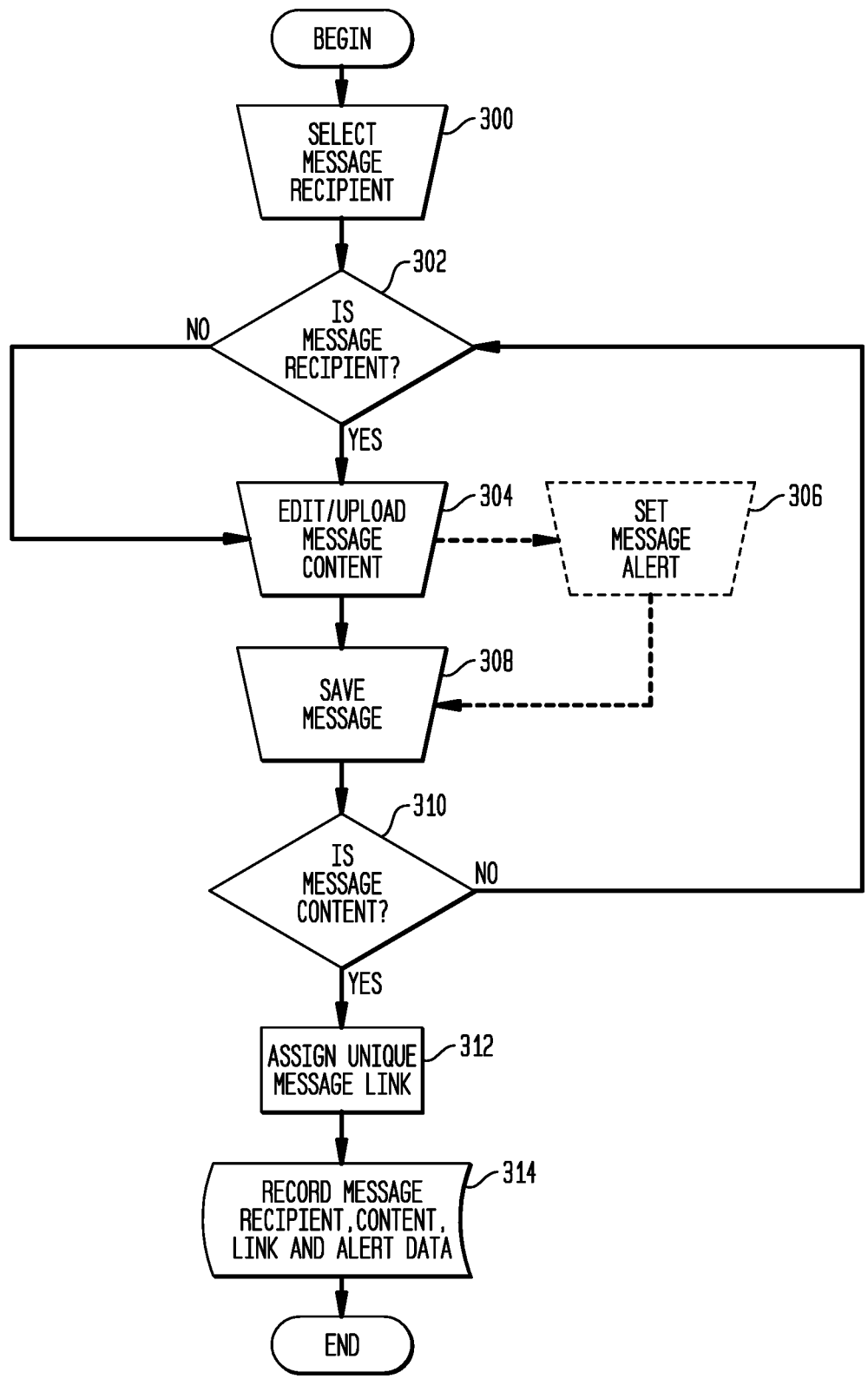

MESSAGE REQUEST

DYNAMIC MESSAGE

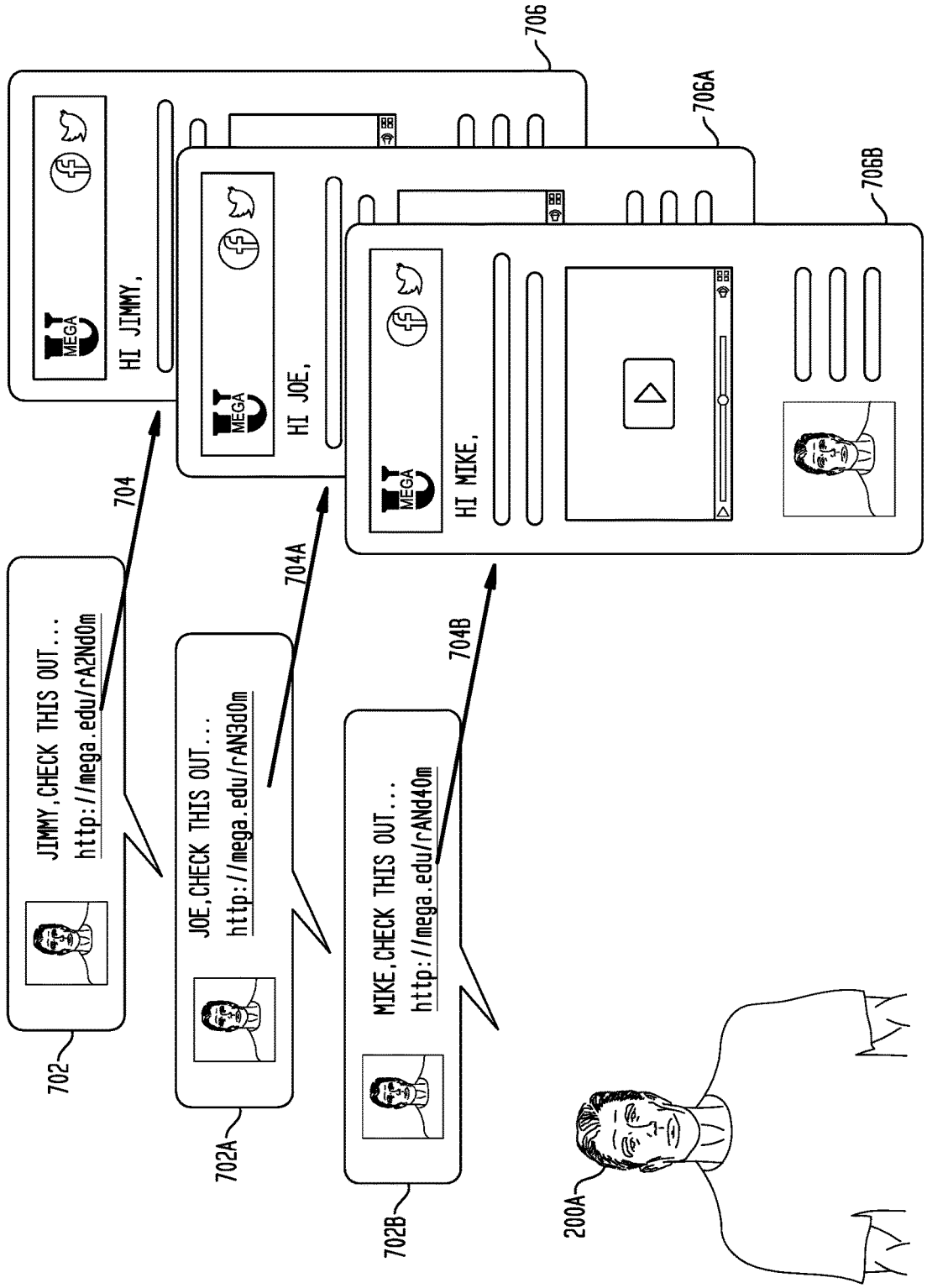

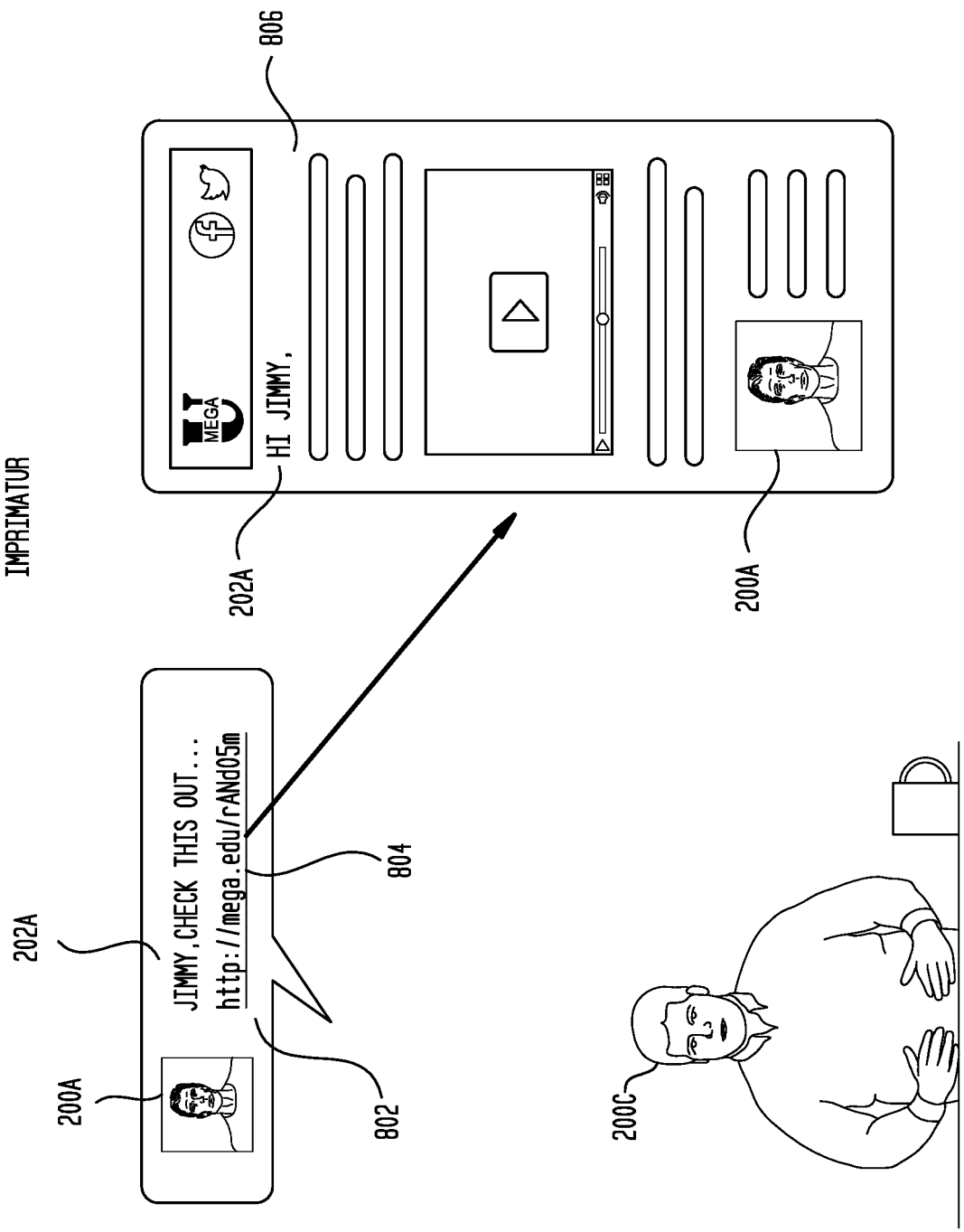

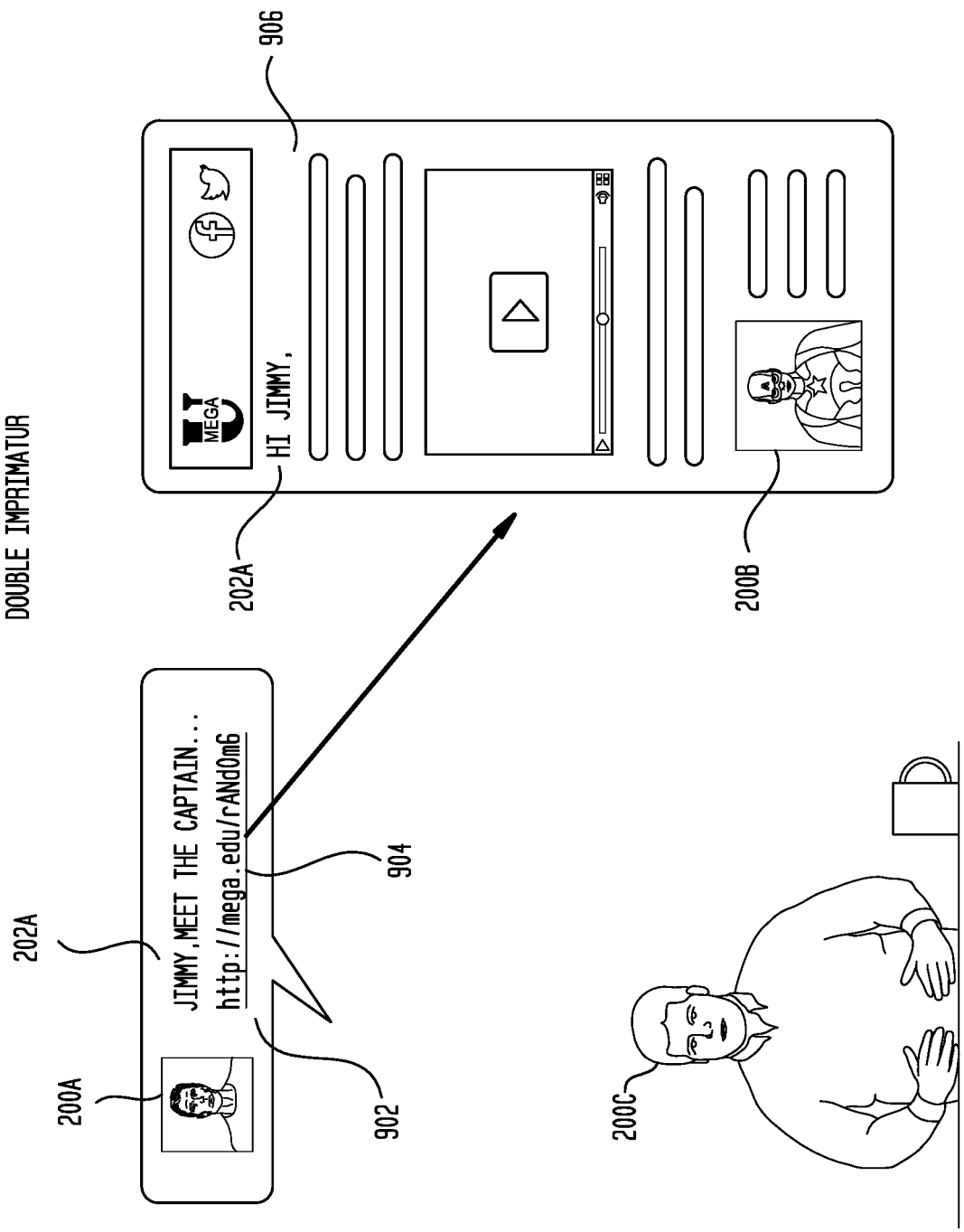

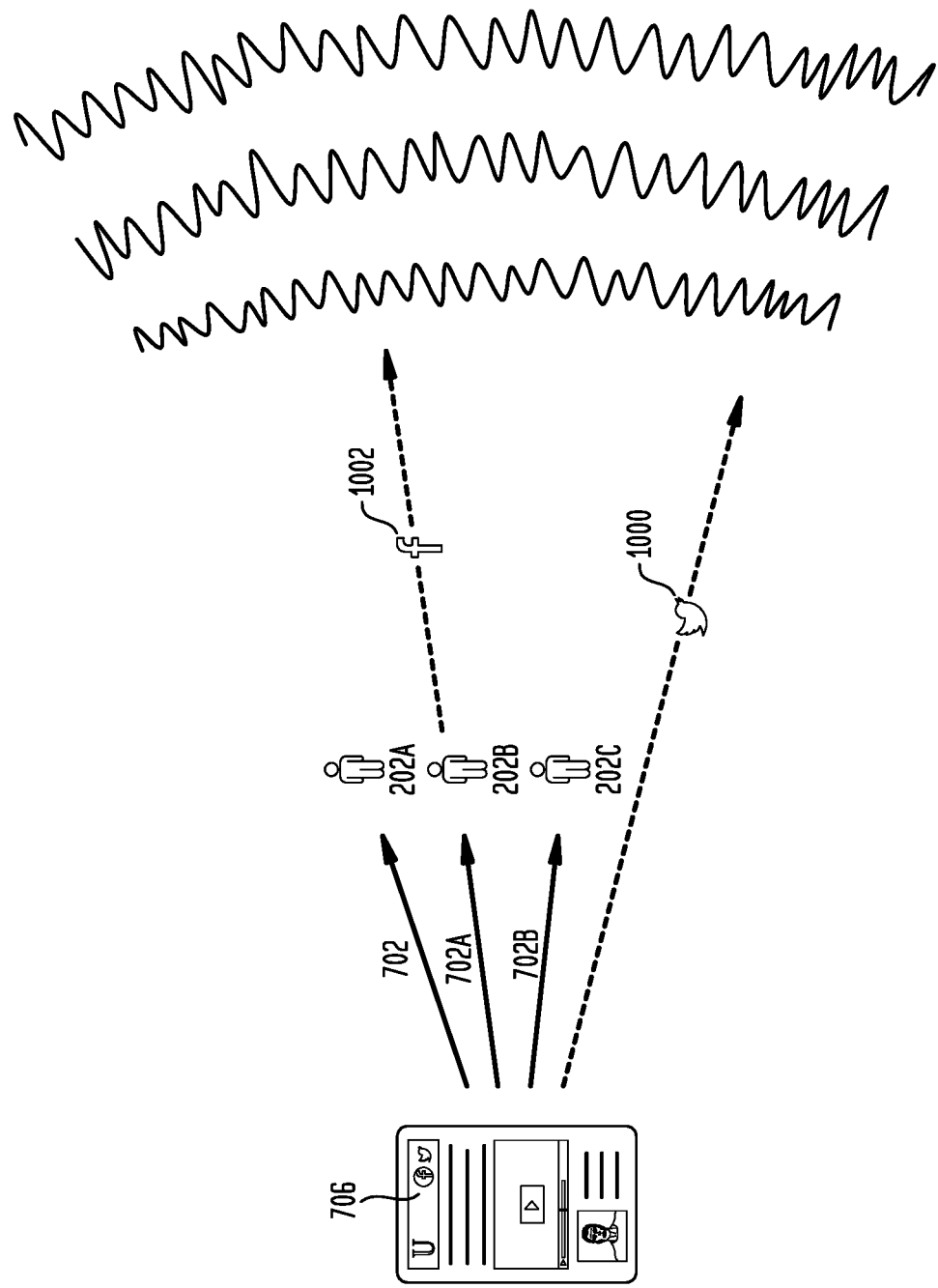

VERIFIED HYPERMEDIA COMMUNICATIONS

CLAIM FOR PRIORITY

This application is a continuation of non-Provisional patent application Ser. No. 15/441,908, filed Feb. 24, 2017. application Ser. No. 15/441,908 was based on U.S. Provisional Patent Application Ser. No. 62/299,517, filed on Feb. 24, 2016. The priorities of applications Ser. No. 15/441,908 and 62/299,517 are hereby claimed, and their disclosures are incorporated herein by reference in their entireties.

FIELD OF INVENTION

The purpose of this invention is to provide a superior messaging alternative to email for delivery of timely, high value person-to-person communications that can be complex and media-rich, yet still easy to receive, consume, and interact with on mobile devices.

BACKGROUND OF THE INVENTION

Messaging by personal computer should be extremely simple, but it isn't. The relatively anonymous nature of electronic communication provides almost innumerable opportunities for deception and abuse limited only by the abundant creativity of thieves and the malicious. Accordingly electronic messaging systems are typically configured to detect spam, spoofs, malware, viruses, Trojan horses as well as a myriad of other scams perpetrated in electronic messaging as the architects of the electronic messaging systems may be able to keep up with. No matter how diligent electronic messaging architects may be, they remain engaged in a constant struggle to stay one step ahead of the most creative of the shady operators. Accordingly, it should be no wonder that the protective means built into electronic messaging systems are quite prone to false positives—blocking innocent content which is desired by the recipient but trips safeguards built into the electronic messaging systems.

SUMMARY OF THE INVENTION

This invention relates to an assisted method for personal communication from a trusted source, which obviates the need for countermeasures and thus makes computer messaging simple for the recipient, at least. Further, the method of the present invention makes it possible to communicate quite detailed and complex personal messages to users of short messaging and social media technologies with immediacy. Since users of social media and short messaging technologies such as SMS, Twitter, Facebook and the like with smart phones often check their pages, SMS and/or Twitter and other social media accounts very frequently, with many updates popping up automatically on the device as they occur, the method of the present invention also enables communication with immediacy, in close to real time.

In practice, a person-to-person message can be composed for the intended recipient comprising the totality of the message to be communicated. Such messages will often be transmitted as hypermedia and often contain content which may not pass through the countermeasures built into many electronic messaging systems without incident. To circumvent this limitation, my invention stores the message on a server connected to a network, with the message being accessible through a corresponding short-link URL comprised of an innocuous, recognizable domain name and a unique, non-sequential, preferably randomized, hash code. We term a hypermedia message so stored and accessible by clicking on a corresponding, recognizable short-link URL as a Dynamic Message.

Methods of retrieving files and/or URL's corresponding to short Links are known from Megiddo et al.; Efficient Retrieval of Uniform Resource Locators; U.S. Pat. No. 6,957,224, which is apparently directed to impersonal advertising and has nothing to offer on person to person communication or the issue of how to get the recipient of a person-to-person message to click on a short link. The key to achieving the above-mentioned goals lies in the use of a direct message to the desired recipient from a known or trusted sender who has permission to communicate with the recipient, wherein the direct message comprises a direct Dynamic Messaging link having a recognizable domain name trusted by the recipient as a source of communications of interest which are free of the maladies common to anonymous email. In particular, the Dynamic Messaging link is a direct link to the Dynamic Message, which is stored in a network accessible device that transmits the dynamic message upon actuation of said dynamic messaging link and thus avoids the snares attendant upon short links that redirect to another site, particularly third party sites that may be dubious. While any method can be used to transmit the dynamic messaging link to the recipient, this is preferably done electronically with the message bearing the imprimatur of an individual known to, and trusted by, the recipient with an innocuous invitation to click on the dynamic messaging link. In this context, "innocuous" should be understood to mean that the invitation and/or Dynamic Messaging link, preferably both, are free of the types of content known to frequently activate protective measures on communications networks—many of the better known short link sites are usually considered highly suspect due to their frequent use by scammers of all sorts. Thus many electronic communications systems will automatically refuse to pass on messages containing redirecting short links, regardless of where they ultimately point to.

Once the recipient clicks on the Dynamic Messaging link, the associated Dynamic Message is transmitted to the recipient anon—presently; so that the recipient can view the message promptly. While establishing the dynamic qualities of the messaging is important, much hinges on the assist—the dynamic messaging link—as communication is completed only when the link is clicked.

In today's world where a single misstep can render a computer useless, the key question is how to get the recipient to click on the link? Preferably, a combination of several factors combine to reassure the recipient that clicking on the link is safe. First is personal recognition. Ideally, the dynamic messaging link is transmitted from an individual known to and trusted by the recipient or, at least over that trusted individual's imprimatur, and the domain name of the Dynamic Messaging link is known to and recognizable by the intended recipient as the source of messages of interest to the recipient from the trusted individual. Second, in most cases, the invitation will be sent by an electronic method requiring at least the recipient's implied permission, as in the case of SMS where the recipient's cell phone number must be known or in the case of Twitter where, at least until recently, permission had to be explicit—i.e., the intended recipient was "following" the sender's tweets. Thus since the recipient will preferably recognize both the sender and the domain name as trusted sources of information of interest to the recipient and since the recipient realizes that he has given permission for that person to send him Dynamic Messaging links, he will recognize that clicking on the link is safe and will provide him with uncontaminated information of interest. Further, as this method is concerned with person-to-person communication wherein the viewing of each dynamic message by its intended recipients is considered important, it is quite significant that the sender can readily determine whether the recipient has clicked on the link to view the message; and, if not, corrective measures can be taken. In preferred embodiments, the sender will be able to determine other significant details concerning viewing of the Dynamic Message from metadata accompanying the recipient's click.

A particular problem with email is that many potential recipients, particularly those of younger generations, view it as antiquated, slow, and almost useless as a means of regular communication with peers, so they check infrequently, if at all, with the result that even if a message gets past the email system, considerable time may lapse before the message is viewed, if it is viewed at all. We address these difficulties by providing a high credibility format for person-to-person communication in which communication is maintained using social media and direct messaging containing branded unique short-links directly to unique person-to-person Dynamic Messages. In this format, the prospect would from time to time receive instant messages, usually 140 characters or less, with a short invitation and some context to click on a unique branded short-link included within. In preferred embodiments, the instant message will be personalized to the recipient and may have a personalized enticement inviting the recipient to click. For example, if coaches at Mega State are recruiting football players, the personalized enticement to click might read: "click this link to see behind the scenes at Mega State." Alternatively, if the recipient is a left tackle, it could say: "click here to see how line men from Mega State have fared in the NFL." It can be appreciated that a whole host of personalized click enticements might be appropriate depending upon the particular athletic program and prospect; but that these would differ from the types of enticements used in connection with advertising and similar broadcast communications. Further, because the domain name is branded and proprietary, it can avoid triggering protective measures designed to bar link shortening methodologies available to all comers, particularly those associated with web-sites often considered dubious or potentially unsafe. As is well known, many of the free, publicly available link shortening methodologies and services have acquired unsavory reputations with the consequence that many electronic communication systems will reject their shortened links; so that in many cases, the host of the link shortening methodology must cease operations, rendering the shortened links useless.

The method of the present invention can thus bypass email altogether, leveraging the currently popular forms of conversational, short-form direct messaging, text messaging and social media to initiate online conversation which will actually get viewed by the intended recipient without languishing in an inbox for several days until the recipient can actually check his email. A particular advantage of bypassing email stems from the ubiquity of spam which is a curse upon this form of communication that has never been perfectly addressed as, while network operators try to devise and implement spam filters, the spammers are even more diligently attempting to devise methods of circumventing the spam filters leading to a Devil's dilemma in which, if the spam filter is too aggressive, desired non-spam messages may be filtered out as false positives and never show up in the inbox; while, if the filter is less aggressive, desired messages may be obscured in a blizzard of spam making it quite difficult to quickly and easily separate the wheat from the chaff and find messages of real interest to the reader/recipient. Or, even worse, malware may slip through disabling the recipient's device. Further, spam filters also can affect what types of content will be viewable. For example, one form of reader might filter out video content, while another might let it pass but remove links based upon particular domain names. This can be extremely detrimental as one of the best ways of ensuring that a message has a good chance of being viewed is to reference and include media, images, audio, and/or video content which are very popular with today's younger generations, many of whom have little patience for wading through the inbox and searching for emails. In contrast, in the practice of the present invention, web copy messages load more correctly, completely and reliably than email, with advanced form content more easily incorporated within the web copy as current web browsers are far more open to advanced forms of content than email browsers. Further, many email readers, particularly in professional and institutional settings do not have the capability to render many popular forms of embedded media and content.

Other aspects and advantages of the present invention are described in the detailed description below and in the claims.

BRIEF DESCRIPTION OF THE DRAWINGS

The invention is described in detail below with reference to the appended drawings, wherein like numerals designate similar parts. In the Figures:

FIG. 3 is a flow chart which illustrates composition of a message for verified hypermedia communications.

FIG. 7 is a schematic of a screen shot schematically displaying transmission of multiple individualized dynamic messages forwarding a dynamic messaging link to a recipient therefor.

FIG. 8 illustrates how imprimatur by a renowned individual enables efficient division of labor in a large organization to achieve efficient widespread distribution of messages using verified hypermedia communications.

FIG. 9 illustrates how imprimatur by a renowned individual can be leveraged to spread imprimatur to another person—introduce—in that organization which further enables even more efficient division of labor in a large organization to achieve efficient widespread distribution of messages using verified hypermedia communications.

FIG. 10 illustrates how message links act not only as an assist mechanism for Dynamic Messaging but also work further to extend the reach of Dynamic Messages.

DETAILED DESCRIPTION OF PREFERRED EMBODIMENTS

Figure 1:
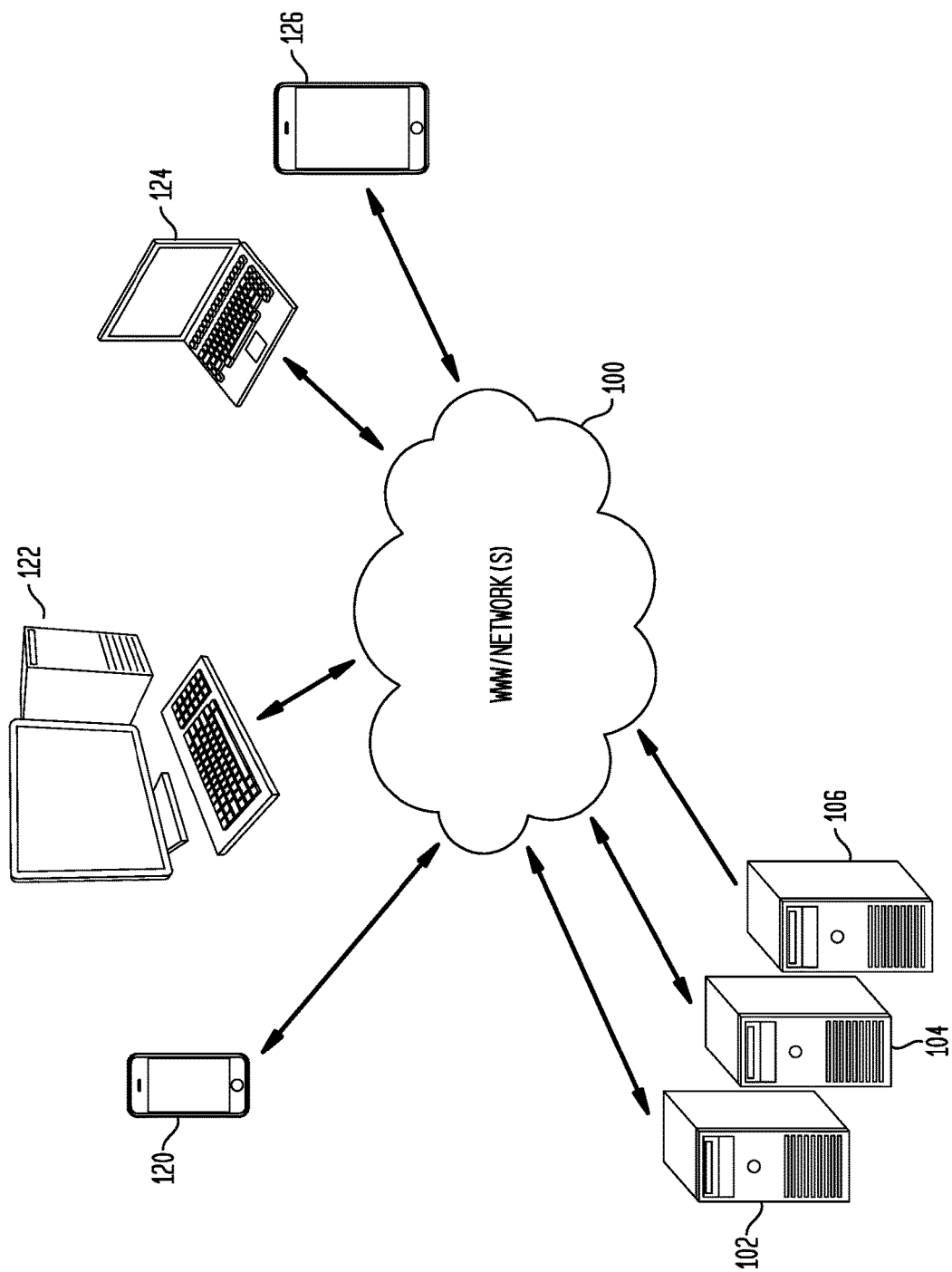
FIG. 1 schematically illustrates the components of a computer communications systems suited for carrying out verified hypermedia communications.

The invention is described in detail below with reference to several embodiments and numerous examples. Such discussion is for purposes of illustration only. Modifications to particular examples within the spirit and scope of the present invention, set forth in the appended claims, will be readily apparent to one of skill in the art. Terminology used herein is given its ordinary meaning consistent with the exemplary definitions set forth immediately below.

The present invention is a messaging and communications system designed to generate and deliver person-to-person messages comprised of content and feature-rich hypermedia, linked to by shortened, branded URL's that are easily distributed by means of direct messaging and social media, or to a lesser extent by email, and provide verification when messages have, or have not, been delivered. Unlike email messages, verified hypermedia messages are not actually sent, but rather the branded, shortened URL links that point back to corresponding verified hypermedia messages, or Dynamic Messages, are distributed instead.

In many cases, by an appropriate choice of branding and subsequent recognition of the domain name within the dynamic messaging link, it will be possible to greatly enhance the attractiveness of actually clicking on the link to the recipient. In other cases, by appropriate choice of the sender listed on the direct or instant message, the chances the dynamic messaging link will be clicked upon can be greatly further enhanced.

Suitable Dynamic Messaging links will comprise two parts: the domain name and the hash code. While the domain name will be registered, proprietary and custom branded for recognition, like the fictitious university: "http://megasta.te", the hash code is random and unique to each specific person-to-person message, for example: "http://megasta.te/rANd0m". A particular advantage flowing from the use of the Dynamic Messaging format of the present invention is that Dynamic Messaging links are private, and can remain private, and not subject to public abuse and misuse or inherent delivery problems which saddle many free short link services. If six places are used with sixty-two alphanumeric characters, including all numbers and upper and lower case letters, over fifty-six billion combinations are possible so random cracking would be reasonably close to impossible. When clicked, the associated Dynamic Message opens in the recipient's default web browser on virtually all mobile, and non-mobile, computing platforms. Another important advantage is that, as mentioned, Dynamic Messages circumvent spam filtering, and the strictures placed upon email while providing far more power and flexibility with respect to content than can be accommodated in most email systems. Further, because the intended recipient presumably knows the sender of the direct message that contains the Dynamic Messaging link, there is little danger that the Dynamic Message accessible through the Dynamic Messaging link will turn out to be spam or malware, thus greatly alleviating any hesitancy the recipient might have to click on it. And, of course, being transmitted by instant messaging, delay is greatly reduced—particularly with young adult millennials and generation Z kids, aka "screenagers" who check their personal devices, messages and social media frequently throughout the day, seemingly from the moment they wake up until the point of falling asleep at night.

An additional benefit is that the sender retains the ability to be notified and/or determine if the message has been received. This capability is particularly important as the present invention is designed to be well suited for, inter alia, recruiting use, high value person-to-person communications rather than mass or broadcast communication, advertising and marketing. In the case of high-value communications where the message is not received or viewed, considerable value flows to the sender having knowledge that the message was never received so that any necessary remedial action can be taken.

In most cases, the short domain name will be registered and associated with the sender of the Dynamic Message so that redirection is not required, although in some cases it may be desirable to allow use of a link that redirects to the servers storing the Dynamic Message. Similarly, the hash code for the Dynamic Message will be unique to that person-to-person Dynamic Message and to that recipient so that the privilege of communicating with the recipient in this fashion is not abused. By suitable choice of the hash code format, preferably at least 6 case-sensitive alphanumeric characters, the privacy of the personal Dynamic Message can be suitably assured, although with simpler hash codes, there is a miniscule chance the Dynamic Message could be happened upon; while ensuring that there is always a trail as the communications engine used to resolve incoming dynamic links and serve subsequent outgoing Dynamic Messages automatically captures and records all messaging transactions. Additionally, the ability to expire and delete Dynamic Messages after corresponding links have been sent and even clicked further protects against the highly unlikely event of accidental clickthrough by an unintended message recipient. It is important to note that even if email is used to transmit the invitation containing the Dynamic Messaging link, important advantages are still obtained as the strictures imposed by the recipient's email system are no longer of significant consequence as the recipient will open the Dynamic Message with a browser, bypassing the email system altogether. Additionally, the message can be updated and even deleted, even after the message has been read, if so desired. Of course a richer, much broader scoped message can be communicated in hypermedia by Dynamic Messaging's obviation of the numerical limitation of characters inherent in short, conversational forms of instant messaging. Additionally, because preferred forms of conversational messaging and social media often come up front and center and get priority treatment on mobile devices, Dynamic Messages will typically be delivered before email is checked.

The invention is particularly well suited for use in situations where there is a need to continuously communicate with a large number of people on behalf of a team or organization and develop relationships bearing on the past, present and future of the program.

Past—Reunion efforts to reassemble groups of people who have had past, possibly dormant, relationships and may have been out of contact for some time.

Present—Retention efforts to stay current and relevant with existing employees and clients, to further those relationships.

Future—Recruiting time and resource consuming relationship development activities are required for competitive and often non-competitive amateur and professional programs.

Consider the athletic department at your local university. To win on the field coaches must communicate convincingly with kids and parents and often recruit competitively for players. To grow off the field, athletic administrators and coaches must communicate frequently and well with alumni, community, and present supporters.

Successful recruiting in college athletics means competing in annual cycles. Therefore, to build strong incoming classes, coaches must continuously establish and develop relationships with new prospective athletes, their families, and others within their circle of influence. With four years of eligibility, just one poor recruiting class can impact the program for a number of years. Naturally, the most recognized coaches and key influencers on campus are often afforded the least amount of time to spend communicating and continuously developing new relationships. Most prospective athletes are naturally eager to communicate with the head coach who is almost always recognized and carries influence with recruits, so it is usually not difficult to acquire permission from athletes to send them messages that can logically bear the imprimatur of the head coach, even though actually prepared by assistant coaches and/or staff under his supervision. This technique works twofold, both saving the time and extending the reach of busy key influencers.

Alternatively, imprimatur can also be further used as a means of personal introduction and for warm transfers such as "Click on the link and Sally will help coordinate your visit." In this case, a known person can send a direct link to a dynamic message facilitating the introduction of another correspondent while simultaneously imparting the known person's imprimatur to the new correspondent. Similarly, the domain name in the Dynamic Messaging link can be chosen, and branded, to reflect the name and/or nickname of the athletic program involved. Both of these factors will greatly increase the probability that the recipient will trust the Dynamic Messaging link and click to view the message. Further the direct message may be composed to entice the recipient to click on the dynamic link. Providing specific context or briefly explaining what the recipient of the direct message will receive by clicking on the short link, for instance, "Click on the link for a video message from Coach" can greatly increase the chance that the dynamic messaging link will be clicked on.

By sending the conversational, short-form instant message under the imprimatur of the head coach, or as a trusted introduction to ("personal note from") the head coach, the chances that the student athlete will click on the link inside the message can be greatly increased. When combined with an appropriate domain name, the recognized sender and an innocuous invitation to click on the Dynamic Messaging link, it is possible to greatly increase the likelihood of successful, timely communication which benefits from the recipient's prompt attention, i.e. is actually viewed by the recipient with interest while it is still relevant.

Since short direct or instant messages can most often only be transmitted to a recipient with the recipient's permission, it can be far easier to obtain that permission for messages from more recognizable figures such as the head coach, and each message sent under his or her imprimatur can work to reinforce the relationship being built with the student athlete prospect. Whoever it is, after the first person in the program establishes contact with a prospect and begins developing a relationship, they can begin introducing other key contacts and sending personal messages from them or on their behalf. Of course, the utility of this system of communication is greatly enhanced when the messages sent are actually meaningful person-to-person messages specifically composed for the intended recipient and not simply just bulk or impersonal mass messaging designed to appeal to some percentage of an audience rather than an audience of one.

Description of System Components

FIG. 1: Network includes a diagram of example network 100, where embodiments may be implemented via service platforms 102, 104, and 106.

Dynamic Messaging system users and recipients interact with service platforms 102, 104, and 106 via any combination of smart phones 120 and networked handheld or embedded devices, tablet 126 computers, desktop 122 and laptop 124 computers that offer Direct Messaging and web browsing capabilities as well as analogous digital mobile or wireless devices that may be used today and in the future, including embedded messaging devices, wrist worn devices, virtual reality devices, smart glasses, and any similar device providing digital communication. It is expected that much of the system interaction will be with mobile computing devices.

Dynamic Messaging system service platforms 102, 104, and 106 (servers) support three distinct core interactive functions, each represented in the diagram by individual servers 102, 104, and 106; comprising Application Server 102, Web Server 104, and Notification Server 106. Users interact with Network 100 via Application Server 102 to compose, verify, and manage messaging operations. For proactive message verification, Notification Server 106 sends system users a variety of direct message and report formats to notify users at periodic intervals and, upon request, alert users when priority messages are served. When Message Links are clicked by Recipients, requests are fielded and associated hypermedia messages are returned from Web Server 104.

To support enhanced data security, personal privacy, and system load requirements, and in an effort to alleviate both process and traffic bottlenecks, associated data stores, media and file systems, and software code may be redistributed to and run from locally networked auxiliary servers within the platform environment. Additionally, the system can be securely updated both periodically and in real time with data maintained elsewhere in off-site stores.

Network 100 may comprise any topology of servers, clients, Internet service providers, and communication media. A system according to embodiments may have a static or dynamic topology. Network 100 may include a secure network such as an enterprise network, an unsecure network such as a wireless open network, or the Internet. Network 100 may also comprise a plurality of distinct networks. Network 100 provides communication between the nodes described herein. By way of example, and not limitation, Network 100 may include wireless media such as acoustic, RF, infrared and other wireless media, particularly those employing some portion or portions of the electromagnetic spectrum.

Many other configurations of computing devices, applications, data sources, and data distribution systems may be employed to implement Dynamic Messaging System. Furthermore, the networked environments discussed in FIG. 1 are for illustration purposes only. Embodiments are not limited to the example applications, modules, or processes.

Figure 2:
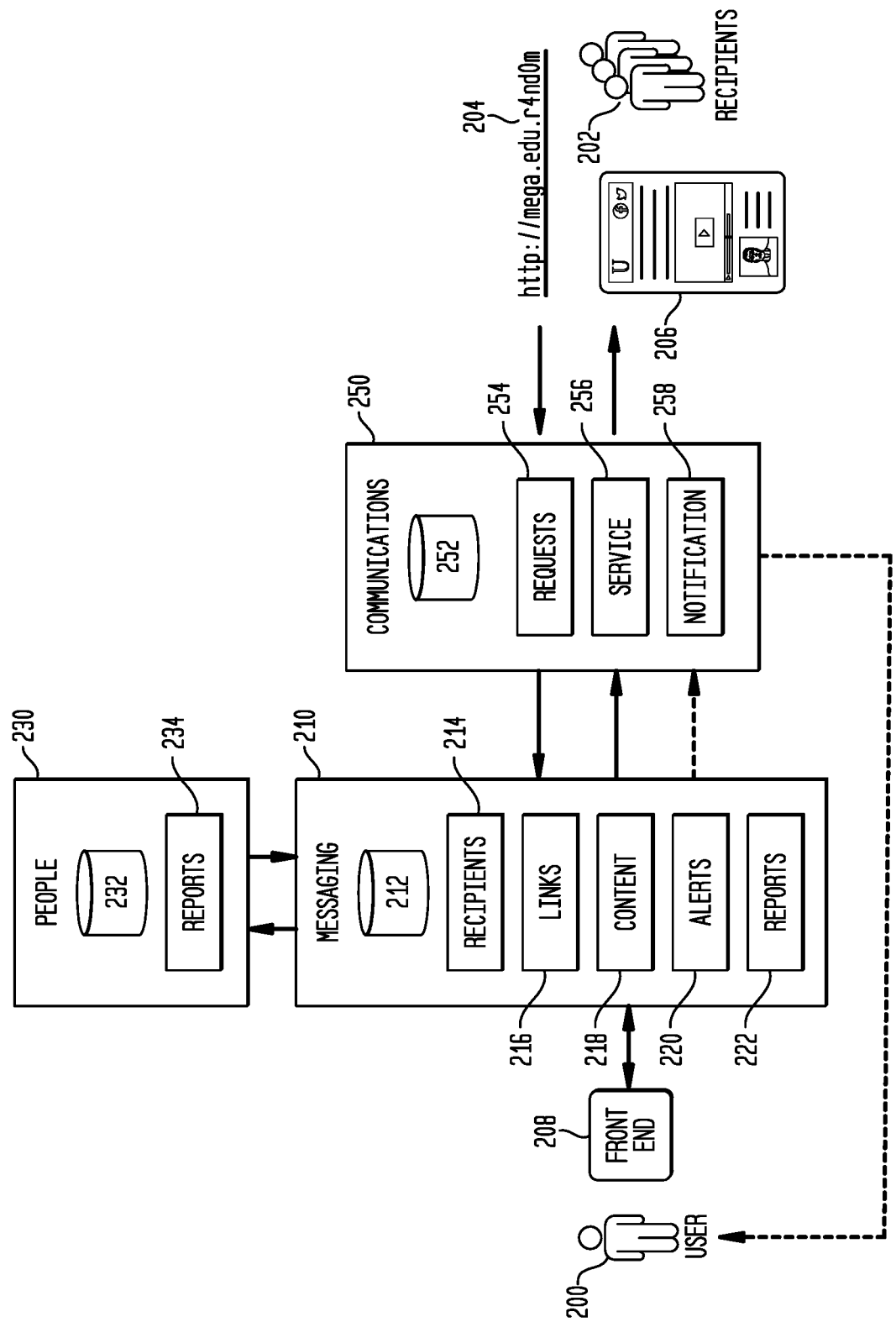
FIG. 2 illustrates information storage as well as information flow from the user/sender to the recipient in verified hypermedia communications.

FIG. 2: System is a high-level diagram that illustrates the three principle software engines that provide verified hypermedia messaging, how they fit together, plus each of the core system components necessary for User 200 to compose and Recipient 202 to request and receive verified hypermedia, or Dynamic Messages, as discussed in further detail below.

Figure 2A:
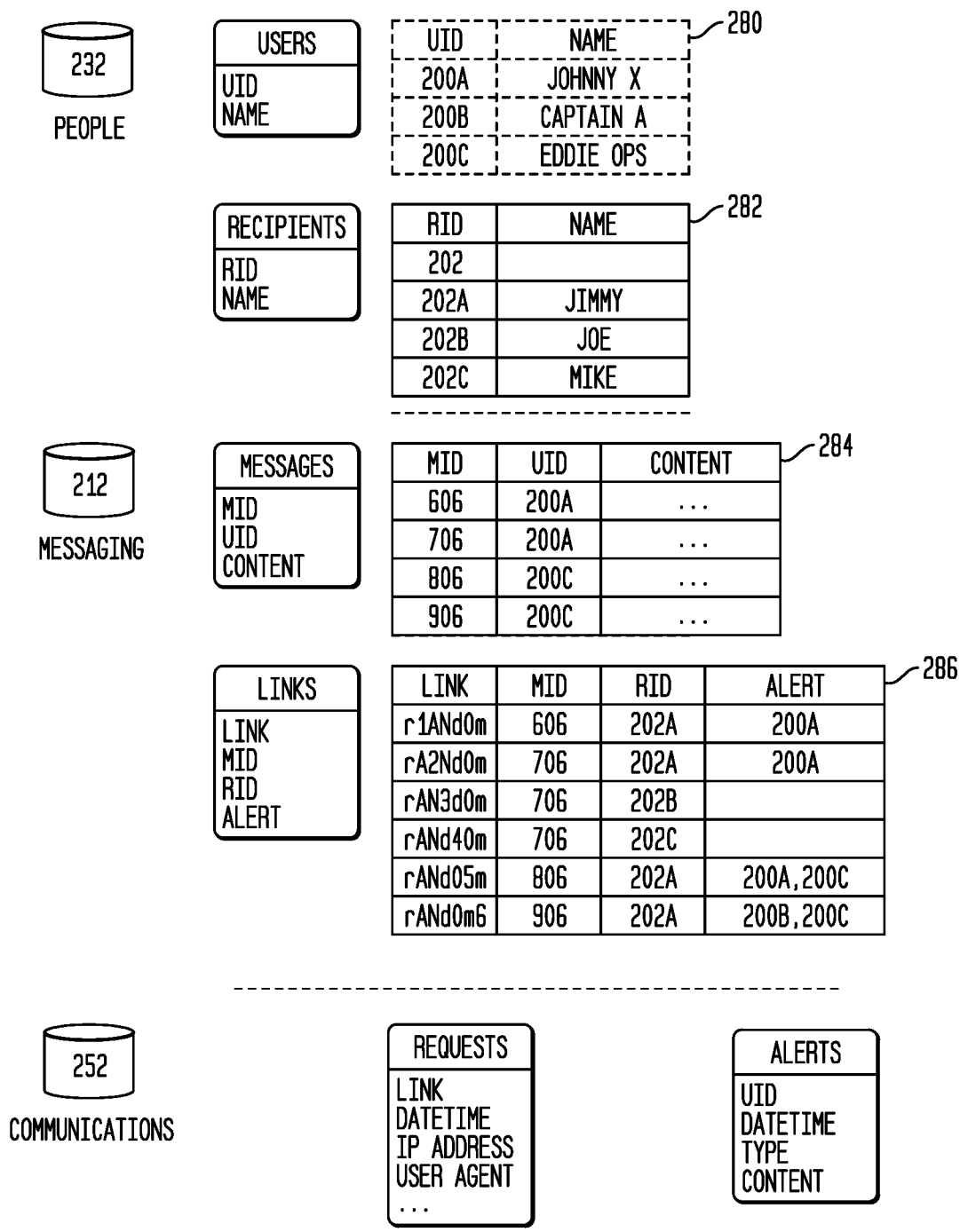
FIG. 2A illustrates storage of information and messages in verified hypermedia communications.

FIG. 2A: Sample Data features data tables to highlight data relationships, provide context, and support subsequent diagrams. For purposes of example, sample system Users 200A, 200B, 200C . . . are defined in table 280 with intended Recipients 202A, 202B, 202C . . . of Dynamic Messages defined in table 282, Additional tables 284 and 286 provide a sample data foundation for Dynamic Messaging examples 606, 706, 806, and 906 featured in FIGS. 6, 7, 8, and 9 respectively.

People 230 engine is used to manage information surrounding system Users (message composers) and Recipients. Person information stored within data store 232 is used to manage contact and context data for each system User 200 and message Recipient 202, populate personalization variables within Dynamic Messages, enable filtered search capabilities, and build distribution lists. Although Recipient data can be managed by system users via Front End 208 application, person data is most often managed elsewhere off-site and imported/updated into Network 100 either by periodic secure file transfers, or in real time via API. Reports 234 module within People 230 engine provides many forms of information on personal communications with each recipient, including all related message postings, click requests and interactions. Advanced analytics work to provide further personal insights into each Recipient's interests, user agent devices, communication patterns and behaviors, based on how they consume and interact with Dynamic Messages over time.

Messaging 210 engine is where the tangible elements of each Dynamic Message come together, and includes data store 212, Link management module 216, Content management module 218, intended Recipients management module 214, as well as associated receipt management module and proactive Alert notification management module 220. When composing a Dynamic Message, content is provided by User 200 through Front End 208 via onboard WYSIWYG web editor and/or can be constructed elsewhere and imported into Content management module 218 via any convenient file upload mechanism. Distribution lists are created and managed within Recipients management module 214 and are comprised of individual Recipients 202, 202A, 202B, 202C . . . stored within People 230 engine. Distribution lists can also be imported from outside sources when composing a message and for each new intended Recipient 202, 202A, 202B, 202C . . . added to the system, an associated Recipient profile is automatically recorded in People 230 engine. A separate, unique messaging link is then automatically assigned to each individual Recipient 202, 202A, 202B, 202C . . . within the distribution list by Links management module 216 when a Dynamic Message is saved to the system. Appropriate alert notification form and timing is then assigned on a per Recipient basis via Alerts notification management module 220 based on default verification actions defined in the Recipient profile within People 230 engine data store 232 often by being entered manually by User 200 via Front End 208 application. Unlike previously described Reports 234 module that provides a micro level accounting and analysis of messages per recipient, Reports 222 module within Messaging 210 engine provides a higher, macro level view of Recipients 202, 202A, 202B, 202C . . . per message.

Communications 250 engine is where Dynamic Messaging activity is handled and recorded in corresponding data store 252. When Recipient 202 clicks on message link 204, it is Requests module 254 that fields the request for the associated message, resolves the incoming link to message, assembles the hypertext document and content infused with appropriate personal data, and then returns the runtime-constructed hypermedia message 206 back to Recipient 202 via Service module 256. Finally, all corresponding alerts of message receipt verification are then sent to User and/or other registered parties through Notification Distribution Module 258 by way of preferred direct messaging, usually SMS or email.

FIG. 3: Compose Message illustrates the process of composing a single person-to-person hypermedia message.

First step 300 in the process of composing a Dynamic Message is selecting Recipient(s) 202, 202A, 202B, 202C . . . . The following step 302 determines whether or not a Recipient has been selected, however as it is not required that a particular Recipient be associated to a particular Dynamic Message (non-personal message to be posted to social media for example), as both yes and no avenues end up at same next step 304, Edit/Upload Message Content. From there, User 200 can either Set Message Alert notifications in step 306 or proceed directly to Save Message in step 308. If the message is empty in next step 310, User 200 is sent back in the process to step 302, otherwise a unique Message Link is assigned in link assignment step 312 and all data surrounding Message Recipients, Content, Links, and Alerts is recorded to Communications Storage 252 in final step 314.

Figure 4:
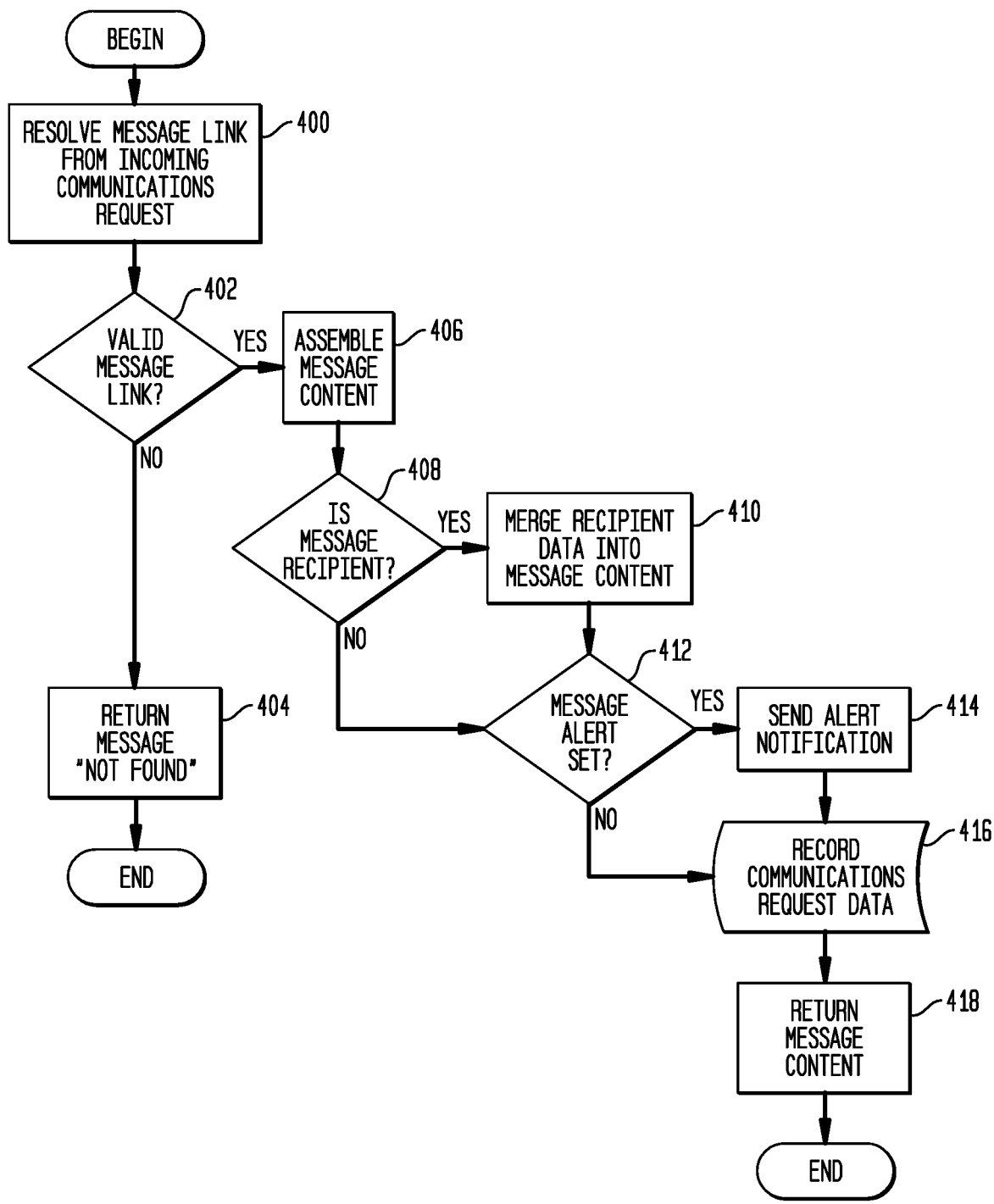
FIG. 4 is a flow chart which illustrates transmission of a message for verified hypermedia communications in response to a recipient transmitting—clicking on—a dynamic messaging link.

FIG. 4: Message Request illustrates the process of servicing an incoming Dynamic Message request.

After webserver 104 fields the initial page request, the incoming URL is further parsed in Link Resolution step 400 to identify the corresponding linked message. If the URL proves not to be valid in Link Validation step 402, a subsequent "page not found" message is returned in Message Not Found step 404, otherwise, content for the corresponding message is assembled in Message Assembly step 406. Recipient Verification step 408 looks to see if the message has an associated Recipient, and if so, selected personal data is then merged into message content in step 410. Alert Status Determination step 412 determines if any receipt verification alerts have been set and if so, alert notifications are sent out in Send Notification step 414. After information surrounding the message request (including data from webserver transaction log to webserver 104 and requesting agent) is recorded to system in following Communications Request Data Record step 416, the fully constructed Dynamic Message is returned in Dynamic Message Transmission step 418.

Figure 5:
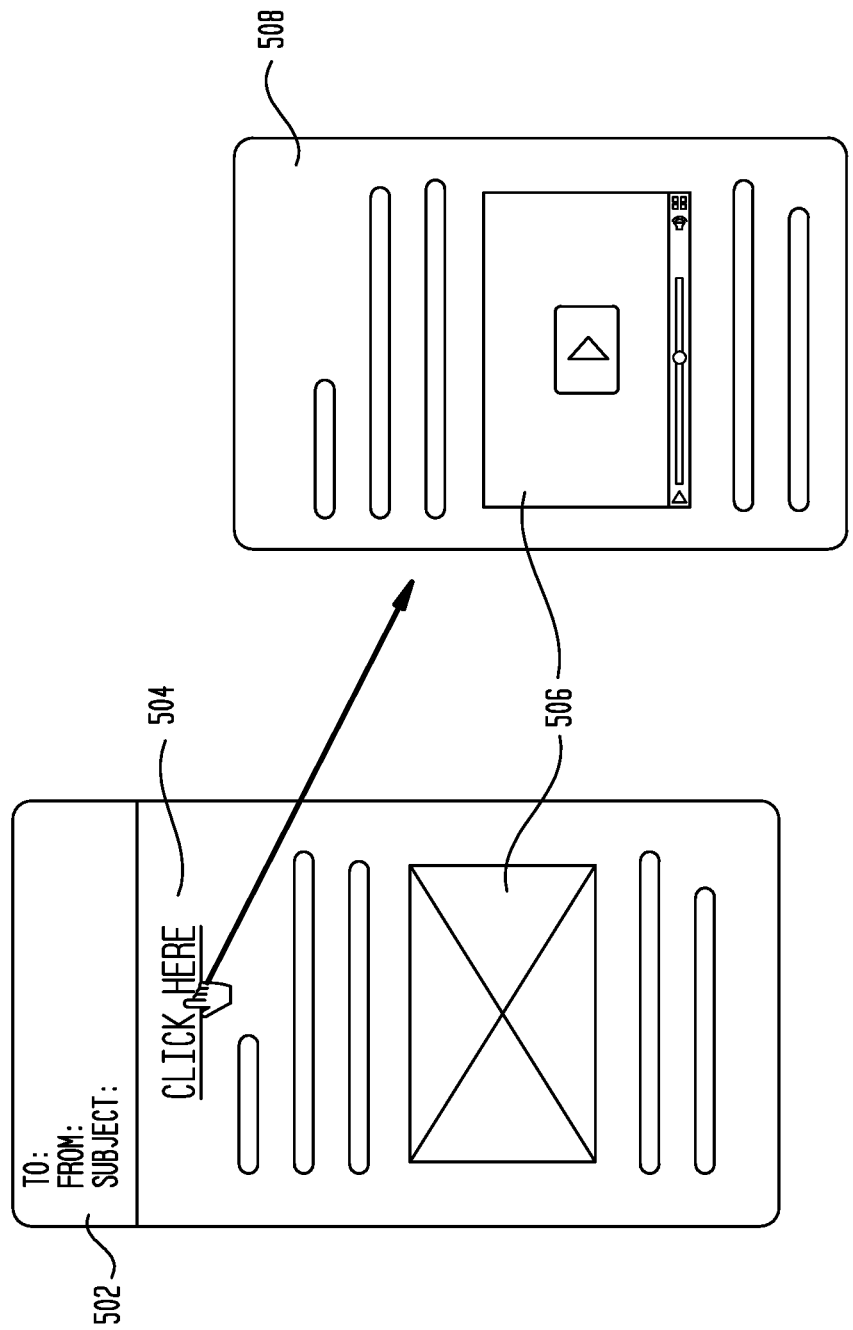
FIG. 5 is a schematic of a screen shot which illustrates transmission of a dynamic messaging link for verified hypermedia communications to transmit a dynamic messaging link to a recipient enabling that recipient to receive a message by transmitting—clicking on—the dynamic messaging hyperlink to receive a message.

FIG. 5: Hypermedia Message illustrates an example of a simple form of networked hypermedia messaging.

Proximate top of commercial HTML email 502 is link 504 that, when clicked by recipient, opens up hypermedia copy 508 of that email inside a web browser. Although video 506 is embedded within both messages, it does not load in HTML email 502. Because the hypermedia copy 508 is not email at all, it is not subject to the same rigorous spam filtering and content restrictions enforced between email server and reader programs. As a result, where embedded video 506 is filtered out of HTML email 502, embedded video 506 loads and runs normally in hypermedia copy 508. Often, hypermedia copy messages not only load more correctly, completely, and reliably than their email counterparts, in many cases, advanced forms of media and content can be incorporated into the hypermedia messages which far exceed the capabilities many email programs can allow, particularly in commonly encountered commercial and institutional settings.

Figure 6:
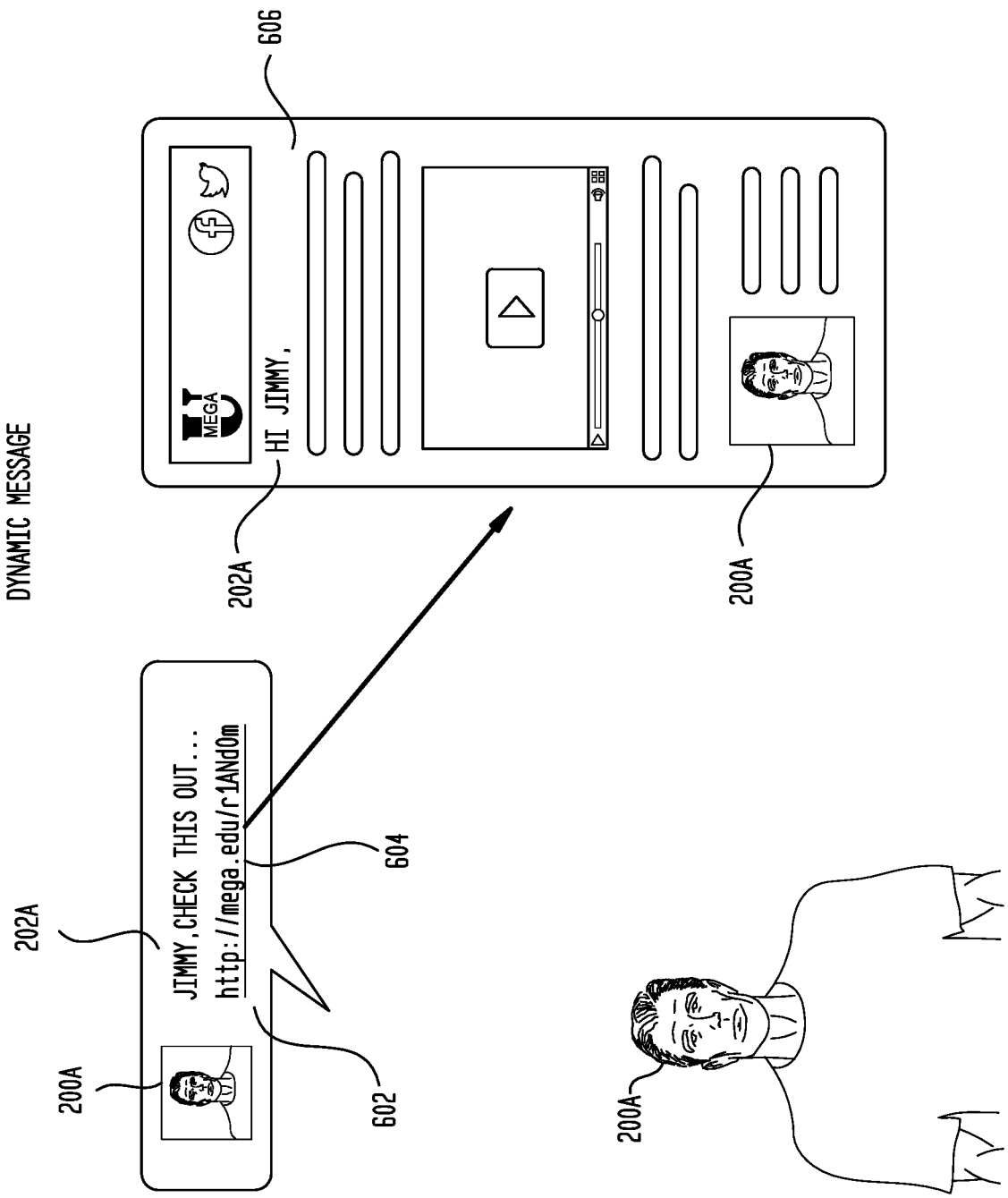
FIG. 6 is a schematic of a screen shot which illustrates display of a message in response to a recipient clicking on a dynamic messaging link for verified hypermedia communications.

FIG. 6: Dynamic Message is a simple example of verified hypermedia messaging. In it, Renowned Individual, User 200A sends text message 602 to Recipient 202A who is aware of User 200A's renown with branded Dynamic Messaging link 604 that points to associated personalized hypermedia message 606.

To load and view hypermedia message 606, Recipient 202A simply clicks on short link 604 inside text message 602. As per data table 286 in FIG. 2A, Renowned Individual, User 200A is then notified immediately.

FIG. 7: In Plurality exemplifies multiple personalized Dynamic Messages. In it, Renowned Individual, User 200A sends out three text messages 702, 702A and 702B to Recipients 202A, 202B, 202C respectively, each enabled with Dynamic Messaging links 704, 704A and 704B, that each point to corresponding hypermedia messages 706, 706A and 706B based on distribution lists that can be manually selected or driven by data while each Recipient's Dynamic Messaging link 704, 704A and 704B, is separate and unique to ensure that each corresponding Dynamic Message 706, 706A and 706B is infused with appropriate data, personalization, and branding, as in FIG. 7.

As per data table 286 in FIG. 2A, User 200A has chosen to be notified immediately only when Recipient 202A clicks and requests Dynamic Message 706, but not when 202B or 202C click through.

FIG. 8: Imprimatur illustrates an example of distribution of labor in dynamic messaging. In it, Renowned Individual 200A's assistant 200C sends text message 802 to Recipient 202A, on behalf of Renowned Individual 200A, with dynamic messaging link 804 which points to corresponding hypermedia message 806, personalized to Recipient 202A, from Renowned Individual 200A. In this example, Renowned Individual 200A's assistant 200C is transparent in the process to Recipient 202A who is aware of 200A's renown, sees and reacts to messaging as if Renowned Individual 200A had sent it himself.

As per data table 286 in FIG. 2A, both User 200C and Renowned Individual 200A will be notified immediately when Recipient 202A clicks and requests Dynamic Message 806.

FIG. 9: Double Imprimatur exemplifies one person using dynamic messaging to leverage the recognition and influence of another to facilitate the personal introduction of a third person. In it, Renowned Individual 200A's assistant 200C sends text message 902 to Recipient 202A who is aware of 200A's renown, on behalf of Renowned Individual 200A, containing dynamic messaging link 904 which points to corresponding hypermedia message 906, also personalized to Recipient 202A, but from yet another Renowned Individual 200B.

As per data table 286 in FIG. 2A, both User 200C and introduced Individual 200B, but not Renowned Individual 200A, will be notified immediately when Recipient 202A clicks and requests Dynamic Message 906.

FIG. 10: Message Power illustrates how message links act not only as an assist mechanism for Dynamic Messaging but also works further to extend the reach of Dynamic Messages.

Similar to FIG. 7, links 704, 704A, and 704B to Dynamic Message 706 are sent via text message to three Recipients 202A, 202B, and 202C respectively while a fourth link to 706 is posted to social media as a Tweet 1000. Additionally, Recipient 202B copies the link from text message 704A and posts it to Facebook 1002. Sending short links to complex messages instead of the messages themselves provides an easy, portable means of distributing messages via direct messaging and social media alike. As a result, the reach of Dynamic Messaging is not simply limited to the number of direct link recipients (plus forwarding), but is further potentiated by the number of friends and followers with access to social media posts containing Dynamic Messaging links and how they further interact with the link and associated Dynamic Message.

While the invention has been described in detail, modifications within the spirit and scope of the invention will be readily apparent to those of skill in the art. In view of the foregoing discussion, relevant knowledge in the art and references discussed above in connection with the Background and Detailed Description, the disclosures of which are all incorporated herein by reference, further description is deemed unnecessary. In addition, it should be understood that aspects of the invention and portions of various embodiments may be combined or interchanged either in whole or in part. Furthermore, those of ordinary skill in the art will appreciate that the foregoing description is by way of example only, and is not intended to limit the invention.

I claim:

1. A method of sustainable personal communication comprising the steps of:
  a. obtaining permission to send personal messages to a recipient from a known individual;
  b. composing a personal transmittable dynamic hypermedia message; assigning a unique dynamic messaging link leading directly thereto and storing said personal transmittable dynamic hypermedia message on a device accessible to a network upon actuation of said unique dynamic messaging link without any form of redirection;
  c. thereafter, sending said recipient an electronic message accurately listing said known individual as sender, said electronic message having said unique dynamic messaging link embedded therein, accompanied by an invitation to click on said unique dynamic messaging link, wherein said unique dynamic messaging link includes primarily a domain name associated with said known individual who is known to said recipient and a unique hash code individualized for each personal transmittable dynamic hypermedia message composed for said recipient;
  d. monitoring said device to determine whether said unique dynamic messaging link has been actuated; and
  e. transmitting said personal transmittable dynamic hypermedia message to said recipient in response to actuation of said unique dynamic messaging link.

2. The method of sustainable personal communication of claim 1, wherein each said unique dynamic messaging link is provided to the recipient via instant messaging.

3. The method of sustainable personal communication of claim 1, wherein each said unique dynamic messaging link is provided to the recipient via MMS or SMS text messaging.

4. The method of sustainable personal communication of claim 1, wherein each said unique dynamic messaging link is provided to the recipient by social media.

5. A system for performing a sustainable method of person-to-person communication comprising the steps of:
  a. creating a transmissible personal hypermedia message and assigning a unique dynamic messaging link leading directly thereto without redirection, and storing said transmissible personal hypermedia message on a device accessible to a network upon actuation of said unique dynamic messaging link, without any form of redirection, wherein said unique dynamic messaging link includes a proprietary domain name, custom branded and selected for sufficient recognition by a recipient to increase a likelihood of the recipient clicking on the unique dynamic messaging link containing said proprietary domain name, and a unique hash code individualized for each transmissible personal hypermedia message created for the recipient;

b. communicating said unique dynamic messaging link to the recipient in a direct message indicating a person known to said recipient as sender;

c. transmitting said transmissible personal hypermedia message to said recipient presently upon actuation of said unique dynamic messaging link, and recording metadata attendant thereupon; and d. monitoring and recording whether said unique dynamic messaging link has been activated and informing the sender thereof if said unique dynamic messaging link has not been activated within a predetermined period of time;

wherein said system comprises a device for storing said transmissible personal hypermedia message and a network accessible to said device.

6. A method of sustainably communicating individual unique personalized messages to a plurality of recipients, comprising the steps of:

a. generating a plurality of individual unique personalized messages in HTML, storing each said individual unique personalized message on a device accessible to a network, assigning each of said plurality of individual unique personalized messages a unique dynamic messaging link leading directly thereto, each said unique dynamic messaging link comprising a proprietary domain name and a unique hash code corresponding to said individual unique personalized message sufficiently recognizable to each recipient thereof to increase the likelihood of the recipient clicking on the unique dynamic messaging link containing said proprietary domain name;

b. electronically providing to each recipient said unique dynamic messaging link, corresponding to each said individual unique personalized message in the form of a descriptive invitation to click upon said unique dynamic messaging link, over an imprimatur associated with the proprietary domain name, said imprimatur being known to its recipient; and c. transmitting said individual unique personalized message upon actuation of its corresponding unique dynamic messaging link.

7. The method of claim 6, wherein a sender is notified when the individual unique personalized message has been transmitted as well as if the individual unique personalized message is not transmitted within a predetermined period of time after transmission of the descriptive invitation.

8. The method of claim 7, wherein metadata accompanying said unique dynamic messaging link is stored and analyzed upon receipt of activation of said unique dynamic messaging link.

9. The method of claim 6, wherein each said unique dynamic messaging link is provided to its recipient via electronic messaging including SMS text, instant messaging, or social media.

10. The method of claim 9, wherein a sender is notified when the individual unique personalized message has been transmitted as well as if the individual unique personalized message is not transmitted within a predetermined period of time after transmission of the descriptive invitation.

11. The method of claim 10, wherein metadata accompanying said unique dynamic messaging link is stored and analyzed upon receipt of activation of said unique dynamic messaging link.

12. A method of sending personalized/individualized communications to a plurality of intended recipients, comprising the steps of:

a. preparing a plurality of personalized/individualized hypermedia communications, at least one for each of said plurality of intended recipients;

b. preparing a plurality of innocuous dynamic messaging links associated with said personalized/individualized hypermedia communications, one for each of said plurality of personalized/individualized hypermedia communications, each said innocuous dynamic messaging link comprising a proprietary domain name and a randomized hash code, each said innocuous dynamic messaging link being unique to one of said personalized/individualized hypermedia communications, said proprietary domain name being selected to be sufficiently recognizable to each of the plurality of intended recipients after repeated exposure to increase the probability that the plurality of intended recipients will click said innocuous dynamic messaging link;

c. storing said personalized/individualized hypermedia communications on a server accessible to a network, each said personalized/individualized hypermedia communication being directly accessible on a web browser without any form of redirection connected to said network by entering its associated innocuous dynamic messaging link; and d. preparing and transmitting a series of invitation messages, at least one to each of said plurality of intended recipients, each said invitation message comprising said innocuous dynamic messaging link, associated with the personalized/individualized hypermedia communication and accompanied by an invitation to click on said innocuous dynamic messaging link to obtain the personalized/individualized hypermedia communication.

13. The method of claim 12, wherein a sender is notified when the personalized/individualized hypermedia communication has been transmitted as well as if the personalized/individualized hypermedia communication is not transmitted within a predetermined period of time after transmission of the series of invitation messages.

14. The method of claim 12, wherein metadata accompanying said innocuous dynamic messaging link is stored and analyzed upon receipt of activation of said innocuous dynamic messaging link.

* * * * *